(No Model.)

E. THOMSON.
ELECTRIC METER.

No. 520,811. Patented June 5, 1894.

WITNESSES.
A. F. Macdonald.
T. J. Johnston.

INVENTOR.
Elihu Thomson
by Geo. R. Blodgett,
Atty.

United States Patent Office.

ELIHU THOMSON, OF SWAMPSCOTT, MASSACHUSETTS.

ELECTRIC METER.

SPECIFICATION forming part of Letters Patent No. 520,811, dated June 5, 1894.

Application filed February 21, 1894. Serial No. 501,012. (No model.)

*To all whom it may concern:*

Be it known that I, ELIHU THOMSON, a citizen of the United States, residing at Swampscott, county of Essex, State of Massachusetts, have invented certain new and useful Improvements in Electric Meters, of which the following is a specification.

My invention relates to electric meters such as have been described by me in my Patent No. 448,894, upon which my present invention is an improvement; and has for its object to provide a means of starting such a meter under small loads, and particularly to a means of providing an initial field or energy-supplying circuit sufficient to overcome the friction coefficient of such matters as I have described; for which purpose I provide, in addition to the series coil of the meter, an auxiliary or shunt coil wound in relation to the armature in such a way as to furnish the field required.

Figure 1:
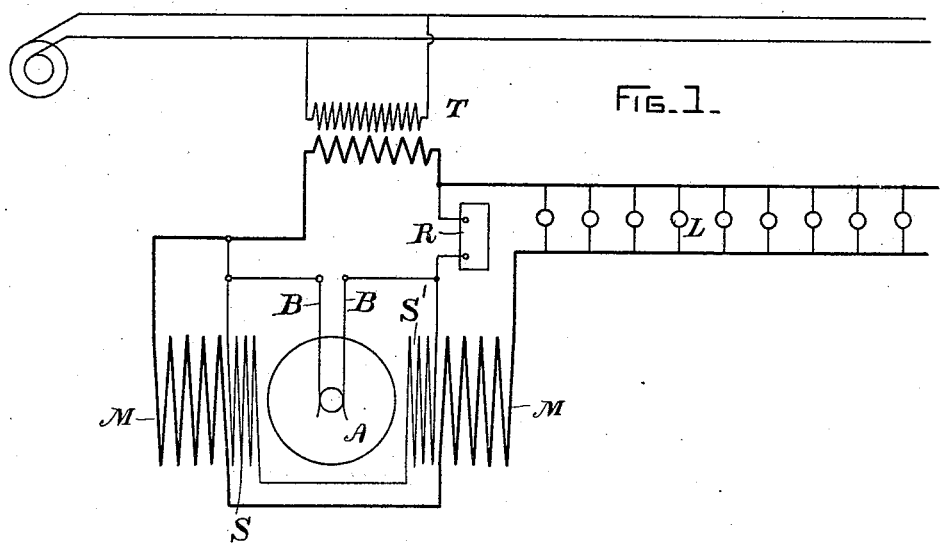
Figure 2:
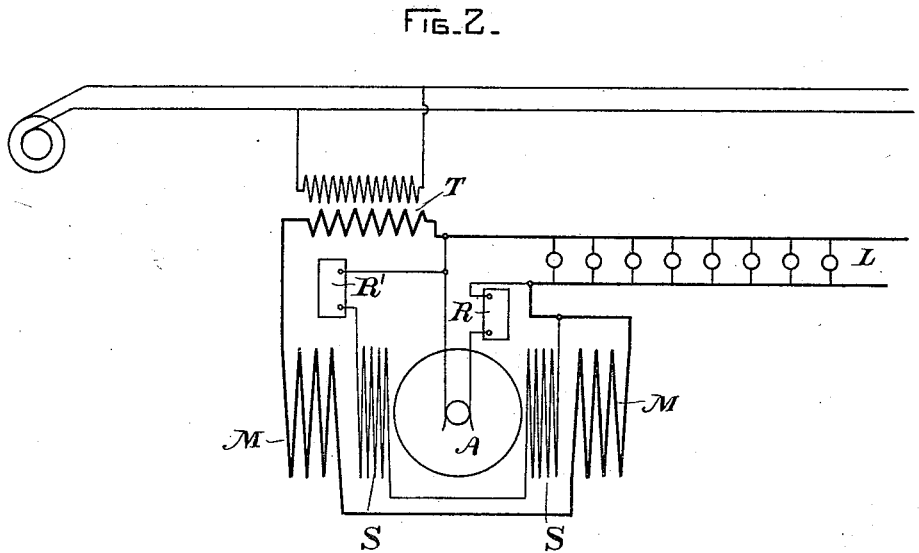

The accompanying drawings show diagrammatic representations of the arrangements which I prefer, Figures 1 and 2 being modifications dependent upon the same principles for their action.

Referring by letter, T is a transformer or other source of electric energy, (it being immaterial what form of energy-supplying device is used.)

L, L represent lamps or other translating devices of any kind, current to run which is to be measured by the meter.

A is the armature of the meter constructed in accordance with the patent already referred to.

B, B are the brushes.

M, M are the series coils of the meter, they being as represented in series with the mains supplying the translating devices with energy and being traversed by the main current or by a definite portion of it.

R is a resistance presently to be referred to.

S, S' are the shunt coils which I prefer to employ to furnish the initial field; as will be readily understood from the description in my patent to which I have referred, the current supplied to the armature is constant and the variations in the series coils M, M are depended upon to furnish variations in speed of the meter according to the amount of current consumed. As illustrated, I wind these auxiliary coils and connect them up in multiple with the armature of the motor. In series with this armature is the resistance R, which should preferably be non-inductive in character.

The winding of the coils S, S' is made just the amount necessary to provide a field sufficient to overcome the friction of the moving parts of the meter, it being arranged thus so that the meter will be as nearly as possible exactly balanced and any current passing through the translating devices will therefore be properly measured. This may be done with a greater or less degree of accuracy; the field provided may fall short of such an amount as will balance by a small margin, or it may be sufficient to cause a very slight or almost imperceptible rotation of the armature, and still be within my invention. The advantage of the system of connection shown is that any slight increase of resistance between the brushes and the commutator tends to increase the effect of the coils S, S' by diverting a little more current into the field, maintaining the sensitiveness of the meter for small loads; while, if a counter-electro-motive force be developed by the armature, no matter how slight it may be, it does not cut down the torque, but diverts the current into the coils S, S', so that the two magnetic effects of the armature and the accessory field are nearly constant when there is no load or a very slight load. While these effects are not attained to absolute precision and may vary one way or the other, the tendencies are in that direction and the general action of the meter is greatly improved. In addition to these advantages, the multiple connection and the resistance employed prevent even the very slight spark sometimes observed and keep the current constant.

Fig. 2 shows a further modification in which the initial field coil S is put in a second derived circuit between the mains; in which case the coil must be made of fine wire and should preferably have in its circuit a resistance as indicated at R'. Because of the increased expense of the two resistances and the number of windings, this arrangement is not so desirable as the one before indicated, although it may be employed, and I consider it within the scope of my invention.

What I claim as new, and desire to secure by Letters Patent of the United States, is—

1. In an electric meter, a series coil, an armature, a resistance in series with the armature, and a shunt coil arranged to furnish an initial or starting field sufficient to balance the friction of the moving parts, such coil being in series with a resistance.

2. In an electric meter, a series coil, an armature arranged in shunt, a resistance in series with the armature and a coil in a circuit derived from the armature circuit and adapted to furnish an initial field sufficient to balance the friction of the moving parts.

3. In an electric meter, a coil in series with the mains supplying the translating devices with the current to be measured, an armature in shunt to such mains, a starting coil in multiple with such armature and a resistance in series with the armature and the starting coil.

4. In an electric meter, a coil in series with the mains supplying the translating devices with the current to be measured, an armature in shunt to such mains, a starting field coil deriving its energy from the armature circuit, and a resistance in circuit with the armature.

In witness whereof I have hereunto set my hand this 19th day of February, 1894.

ELIHU THOMSON.

Witnesses:
JOHN W. GIBBONEY,
CHARLES E. HARTHAN.